US008650189B2

(12) United States Patent
Fertik et al.

(10) Patent No.: US 8,650,189 B2
(45) Date of Patent: Feb. 11, 2014

(54) SYSTEMS AND METHODS FOR DETERMINING VISIBILITY AND REPUTATION OF A USER ON THE INTERNET

(75) Inventors: Michael Benjamin Selkowe Fertik, Palo Alto, CA (US); Thomas Gerardo Dignan, Mountain View, CA (US)

(73) Assignee: Reputation.com, Redwood, CA (US)

( * ) Notice: Subject to any disclaimer, the term of this patent is extended or adjusted under 35 U.S.C. 154(b) by 0 days.

(21) Appl. No.: 13/591,096

(22) Filed: Aug. 21, 2012

(65) Prior Publication Data

US 2013/0007014 A1 Jan. 3, 2013

Related U.S. Application Data

(63) Continuation of application No. 13/172,785, filed on Jun. 29, 2011.

(51) Int. Cl.
*G06F 17/30* (2006.01)
*G06F 7/00* (2006.01)

(52) U.S. Cl.
USPC ............ 707/728; 707/727; 707/708; 707/709

(58) Field of Classification Search
USPC ................... 707/728, 727, 708, 709; 715/229
See application file for complete search history.

(56) References Cited

U.S. PATENT DOCUMENTS

| | | | | |
|---|---|---|---|---|
| 6,484,068 | B1 * | 11/2002 | Yamamoto et al. | 700/245 |
| 7,634,810 | B2 * | 12/2009 | Goodman et al. | 726/22 |
| 2002/0111847 | A1 | 8/2002 | Smith | |
| 2004/0019846 | A1 * | 1/2004 | Castellani et al. | 715/500 |
| 2006/0161524 | A1 | 7/2006 | Roy et al. | |
| 2006/0174343 | A1 * | 8/2006 | Duthie et al. | 726/23 |
| 2006/0253584 | A1 * | 11/2006 | Dixon et al. | 709/225 |
| 2008/0077577 | A1 * | 3/2008 | Byrne et al. | 707/5 |
| 2009/0070325 | A1 * | 3/2009 | Gabriel et al. | 707/5 |
| 2010/0262454 | A1 * | 10/2010 | Sommer et al. | 705/10 |
| 2010/0262601 | A1 * | 10/2010 | Dumon et al. | 707/727 |
| 2011/0078049 | A1 * | 3/2011 | Rehman et al. | 705/27.1 |
| 2011/0153551 | A1 | 6/2011 | Gabriel et al. | |
| 2013/0007014 | A1 * | 1/2013 | Fertik et al. | 707/748 |
| 2013/0124653 | A1 * | 5/2013 | Vick et al. | 709/206 |

OTHER PUBLICATIONS

PCT Notification of Transmittal of the International Search Report and the Written Opinion of the International Searching Authority for International Application No. PCT/US2012/044668, dated Dec. 21, 2012, 11 pages.

* cited by examiner

*Primary Examiner* — Kuen Lu
(74) *Attorney, Agent, or Firm* — Finnegan, Henderson, Farabow, Garrett & Dunner LLP

(57) ABSTRACT

An apparatus comprises a visibility module configured to derive a hit visibility score for one or more hits from an information source, wherein the one or more hits are directed to a target entity, and wherein the hit visibility score indicates a likelihood that a corresponding hit is found by a searcher after the searcher searches for the target entity in the information source; a sentiment module configured to derive a hit sentiment score for at least one of the one or more hits, wherein the hit sentiment score indicates a sentiment about the target entity conveyed by the at least one of the one or more hits; and a reputation module configured to derive a reputation for the target entity based on the hit visibility score and the hit sentiment score.

21 Claims, 8 Drawing Sheets

FIG. 8
800
reputation.com
808
MyPrivacy
MyReputation
ReputationDefender
804
802
810
NEGATIVE
MODERATE
Welcome to the new Reputation.com dashboard!
806
PERSONAL DATA
View Details
820
PUBLIC IMAGE
View Details
830
YOUR GOOGLE TOP 20 RESULTS ASSESSMENT
1 Negative
3 Positive
59
11
45%
spokeo

SYSTEMS AND METHODS FOR DETERMINING VISIBILITY AND REPUTATION OF A USER ON THE INTERNET

CROSS-REFERENCE TO RELATED APPLICATION

This application is a continuation of U.S. application Ser. No. 13/172,785, filed Jun. 29, 2011, which is incorporated in its entirety by this reference thereto.

FIELD OF TECHNOLOGY

The present disclosure relates to methods, systems, and apparatuses for determining reputation of people and in particular for determining visibility and reputation of Internet users on the Internet.

BACKGROUND

Since the early 1990s, the number of people using the World Wide Web and the Internet has grown at a substantial rate. As more users take advantage of the services available on the Internet by registering on websites, posting comments and information electronically, participating in the social or professional networks, or simply interacting with companies that post information about others (such as online newspapers), more and more information about users becomes publicly available online. Naturally, individuals, organizations, and companies such as professionals, parents, college applicants, job applicants, employers, charities, and corporations have raised serious and legitimate concerns about coping with the ever-increasing amount of information about them available on the Internet, because online content about even the most casual Internet users can be harmful, hurtful, or even false.

The process of evaluating a user in a variety of professional or personal contexts has become increasingly sensitive to the type and quantity of information available about that user on the Internet. A user may want to determine the level of visibility of themselves or of other users on the publicly available information sources. Moreover, one may want to find out whether each information contributes to a positive or a negative visibility for the user. Further, one may want to assess the overall visibility of a user, whether a user is highly visible or not, and in each case, whether that visibility is a positive or a negative visibility, that is amounting to a good or to a bad reputation. A user may want to identify and remove publicly available information that contribute to a negative reputation and instead highlight those that contribute to a positive reputation.

Further a user may desire an easy way to assess whether she, or somebody she is interacting with, has accrued an overall reputation that is generally positive or negative or positive or negative with regard to a certain aspect of their reputation. Exemplary interactions of a user with another include, for example, beginning a romantic relationship, offering an employment or business opportunity, or engaging in a financial transaction. As the amount of available online information about a user increases, the process of sifting through all of that information, assessing its relative import, classifying it, and synthesizing it down to a general assessment of the user's public online reputation becomes more daunting.

BRIEF DESCRIPTION OF THE DRAWINGS

It is to be understood that following detailed description is exemplary and explanatory only and is not restrictive of the invention, as claimed. The accompanying drawings, which are incorporated in and constitute a part of this specification, illustrate several embodiments of the invention and together with the description, serve to explain the principles of the invention. In the drawings:

DETAILED DESCRIPTION

Figure 1:
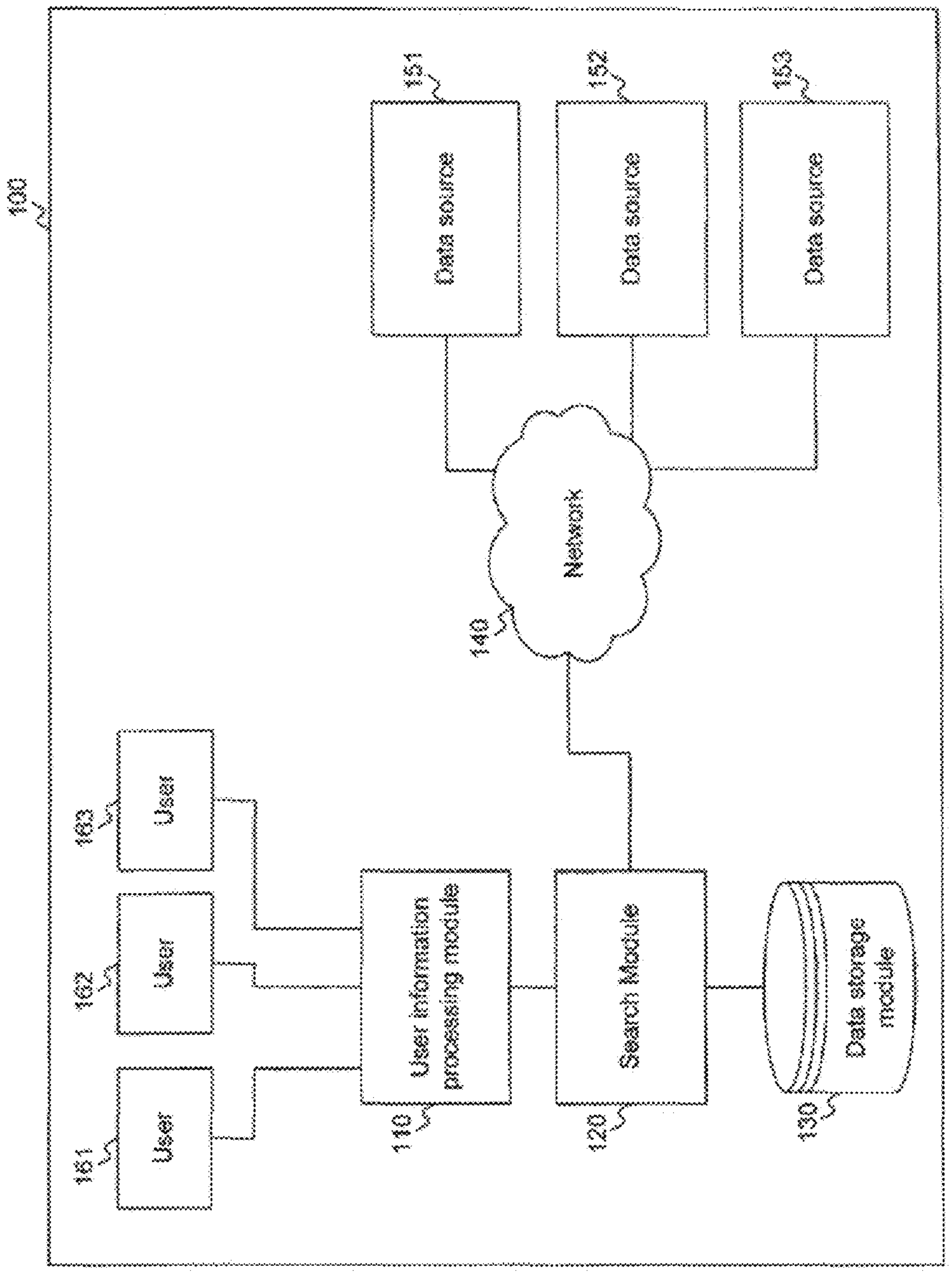
FIG. 1 is a block diagram depicting an exemplary system for analyzing information about a user in accordance with some embodiments.

For simplicity and clarity of illustration, reference numerals may be repeated among the figures to indicate corresponding or analogous elements. Also, similarly named elements perform similar functions and are similarly designed, unless specified otherwise. Numerous details are set forth to provide an understanding of the embodiments described herein. The embodiments may be practiced without these details. In other instances, well-known methods, procedures, and components have not been described in detail to avoid obscuring the example embodiments described herein. The description is not to be considered as limited to the scope of the example embodiments described herein.

FIG. 1 is a block diagram depicting an exemplary system 100 for analyzing information about a user in accordance with some embodiments. In example system 100, search module 120 is coupled to user information processing module 110, data storage module 130, and network 140. Search module 120 is also coupled to one or more data sources, such as data sources 151, 152, and 153, either via network 140 or via other coupling (not pictured). Data sources 151, 152, and 153, may be proprietary databases containing information about one or more users 161, 162, and 163. Exemplary data sources 151, 152, and 153 may be, for example, "blogs," or websites, such as social networking websites, news agency websites, private party websites, or company websites. Exemplary data sources 151, 152, or 153 may also be cached information stored in a search database, such as those maintained by Google™ or Yahoo!™ or information suggested by search databases (e.g., such as additional terms suggested by Google™ after a term has been typed in). Exemplary data sources 151, 152, or 153 may further be, for example, criminal or civil courts databases or listings, credit agency data sources, insurance databases, professional information databases, personal information databases, or any electronic or other source of information about user 161, 162, or 163. System 100 may include any number of data sources 151, 152, and 153 and may be used by any number of users, human agents and/or third parties.

One or more users 161, 162, or 163 may interact with user information processing module 110 through, for example, personal computers, personal data devices, telephones, or other devices connected to the user information processing module 110 via network 140, or via other connections through which they may interact with user information processing module 110.

One or more users 161, 162, or 163 may directly or indirectly provide user information processing module 110 with information or search terms that identify a user. User information processing module 110 or search module 120 may use the identifying information or search terms to construct searches to find information, or search results, about a user. The search module 120 then may search a data source 151, 152, or 153, using at least one search term, for information about a user. A search result about a user may be stored in data storage module 130 or analyzed by user information processing module 110.

Network 140 may be, for example, the Internet, an intranet, a local area network, a wide area network, a campus area network, a metropolitan area network, an extranet, a private extranet, any set of two or more coupled electronic devices, or a combination of any of these or other appropriate networks.

The coupling between modules, or between modules and network 140, may include, but is not limited to, electronic connections, coaxial cables, copper wire, and fiber optics, including the wires that comprise network 140. The coupling may also take the form of acoustic or light waves, such as lasers and those generated during radio-wave and infra-red data communications. Coupling may also be accomplished by communicating control information or data through one or more networks to other data devices.

Figure 2:
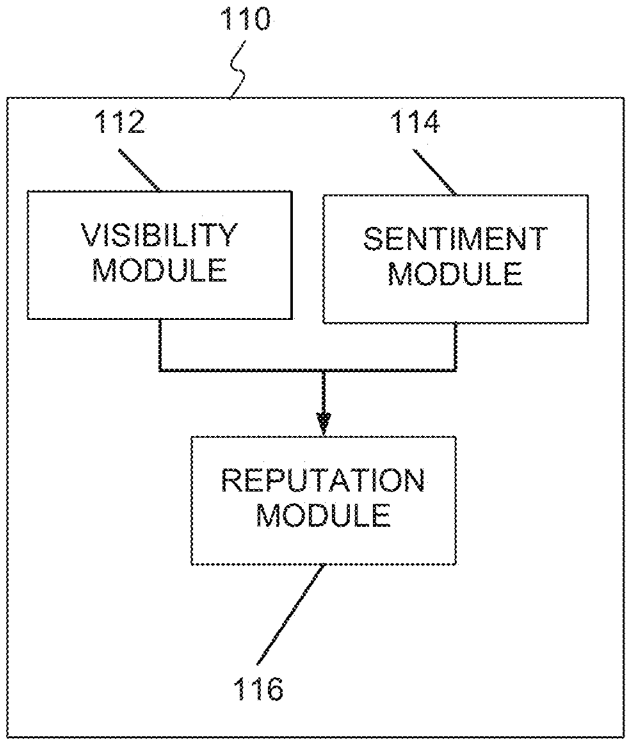
FIG. 2 is a block diagram depicting the user information processing module in accordance with some embodiments.

FIG. 2 is a block diagram depicting the user information processing module 110 (hereinafter abbreviated to UIP module 110) in accordance with some embodiments. UIP module 110 includes a visibility module 112, a sentiment module 114, and a reputation module 116. UIP module 110 in general receives from, for example, search module 120, results of a search. The search may be, for example, based on one or more search terms submitted by a searcher who is looking for information about an entity (e.g, user or a corporate entity) that is the target of the search. The search results may include one or more "hits", for example, URLs or webpages that include information about the target. The search results may also include data from other types of data sources such as court or police databases, professional information databases, personal information databases, or publication databases.

UIP module 110 submits the search results to visibility module 112 to determine the visibility of each of the search results or the overall visibility of the target. The visibility of a search result is a measure of the likelihood that a searcher, using the search term, finds and reviews the specific search result.

UIP module 110 also submits the search results to sentiment module 114 to determine the sentiment of each of the search results. The sentiment of a search result indicates the effect of that search result on a searcher that reviews the contents of the search result. In some embodiments, the sentiment indicates whether the result conveys a positive image or a negative image of the target to a reviewer of its content. In some embodiments, visibility module 112 and sentiment module 114 can be combined into a single module or rearranged so that the output of one is received by the other.

Reputation module 116, on the other hand, determines the reputation of the target based on the search results. In some embodiments, reputation module 116 uses, as input, the visibility or the sentiment of one or more of the search results, as respectively determined by the visibility module 112 and sentiment module 114, or both.

In some embodiments, visibility module 112 receives one or more search results and determines the visibility of each of the search results. In some embodiments, search results are in the form of URLs or webpages received from search module 120. In some other embodiments, search results are in the form of photos, pictures, documents, or data tables. In some embodiments, visibility module 112 receives the search results in the form of a complete list of search results as provided by each of one or more search modules. In some embodiments, the one or more search modules include one or more search engines. In some embodiments, a search module receives some search results from one or more search engines. For example, a searcher may try to learn about the target by inputting the name of the target as the search term into one or more search engines. A search engine may find multiple search results, or "hits" that correspond to the search term. A search engine, such as Google™, may thus sort the list of the hits and display the list on one or more results pages. In some embodiments, the visibility module receives the one or more results pages.

In some embodiments, visibility module 112 receives a purged list of search results corresponding to the search term in the same order and as divided into the same result pages that they appear to a searcher. Because many of the hits found by a search engine may not correspond to the target, the false hits may be removed before the list is passed to visibility module 112. For example, searching by the name of a target may result in many false hits that correspond to a different user with the same name as the target. In some embodiment, a purging module uses an algorithm to purge the list from false hits and passes to UIP module 110 only the true hits. In some embodiments purging is performed by using cluster algorithms. Visibility module 112 may receive the purged list, which only includes real hits.

In some embodiments, although visibility module 112 receives a purged list including only the real hits, it also receives the positional information of each real hit in the original search result list. In some embodiments, the positional information includes the page number of the search result page on which each real hit appears, the location in which the real hit appears on that page, and the total number of hits, real or false, that appear on that page. For example, the complete, non-purged search results may include twenty seven hits. The search engine may sort the twenty seven hits based on its own internal algorithm, and present those hits in result pages each of which fit a maximum of ten results. Thus, the sorted results list will be presented in three pages, such that pages one to three respectively display hits 1 to 10, 11 to 20, and 21 to 27 in that order. Of these search results, however, only some hits may be kept as true hits, for example, hits 2-5, 9, 11, 15-17, 20, 24, 26, and 27, and the remainder hits may be purged. Out of the twenty seven original hits, visibility module 112 may thus only receive thirteen hits, which are the true (not-purged) hits 2-5, 9, 11, 15-17, 20, 24, 26 and 27. Nevertheless, in some embodiment, visibility module 112 also receives the additional information determining the position of each real hit in the original, non-purged list. In some embodiment, visibility module 112 may receive the additional information that includes the total number of hits in the original list, the ordinal number of each hit in the original list (that is, its order in the list, which are respectively 2, 3, 4, 5, 9, 11, 15, 16, 17, 20, 24, 26, and 27 for the thirteen true hits in this example) and the number of hits in each page (here 10 for the first two pages, and 7 for the third page). Using this information, visibility module 112 can rebuild the position of each true hit in the original list. That is, for example, visibility module 112 can determine that the first five received hits (hits 2-5, and 9) are true hits that appear on the first page of the original list at locations 2, 3, 4, 5, and 9 of a list of ten results, the next five hits (hits 11, 15-17, 20) are true hits that appear on the second page of the original list at locations 1, 5, 6, 7, and 10 in a list of ten hits, and the next three hits (hits 24, 26, and 27) are true hits that appear on the third page of the original list at locations 4, 6, and 7 in a list of seven hits. These information are relevant, because, in some embodiments, the visibility of a hit depends on its position in the original list, that is, its page and its location on that page.

In some embodiments, visibility module 112 determines the visibility of each of the search results as a measure of the likelihood that a searcher notices and reviews that specific search result. In various embodiments, visibility module 112 determines the visibility of a search result by using various factors, for example, the positional information of the search result in the original search result list, the popularity of the search engine providing the result, or the appearance of the search result in the list of search results. In some embodiments, visibility module 112 determine a quantitative measure of the visibility of a search result in the form of a visibility score.

In some embodiments, visibility module 112 receives, along with each search result, the positional information of the search result in the original search result list and uses that positional information to determine the visibility score of the search result. Visibility module 112 assigns different visibility scores to search results that appear at different positions in the original search list, based on their positional information. In some embodiments, visibility module 112 assigns a larger visibility score to hits that appear on an earlier page of the search results compared to those that appear on a later page. In particular, in some embodiments, the visibility score of a hit drops drastically as the search list moves from one page to the next, because a searcher is likely to pay more attention to the earlier pages, and sometimes will not browse later pages at all. Further, in some embodiments, for hits that appear on the same page, visibility module 112 assigns a larger visibility score to hits that appear higher, because a searcher is more likely to browse a search results page from the top to the bottom and to notice more the hits that are located higher.

In some embodiments, visibility module 112 uses the positional information as an input to an algorithm that calculates the visibility score. In some embodiments, the visibility score algorithm uses a positional visibility function that receives the positional information as inputs and provides the visibility score as an output. In some embodiments, the positional visibility function is generally a decreasing function of the position. In some embodiments, the positional visibility function assigns the largest visibility score to the hit at position 1 on page 1 of the search results and generally decreases the visibility score as the page number or the location inside the same page increases. In some embodiments, visibility module 112 can take into consideration that a hit at position 1 on page 2 is more visible than a hit at position 8 on page 1 and adjust the positional visibility function accordingly.

Figure 3:
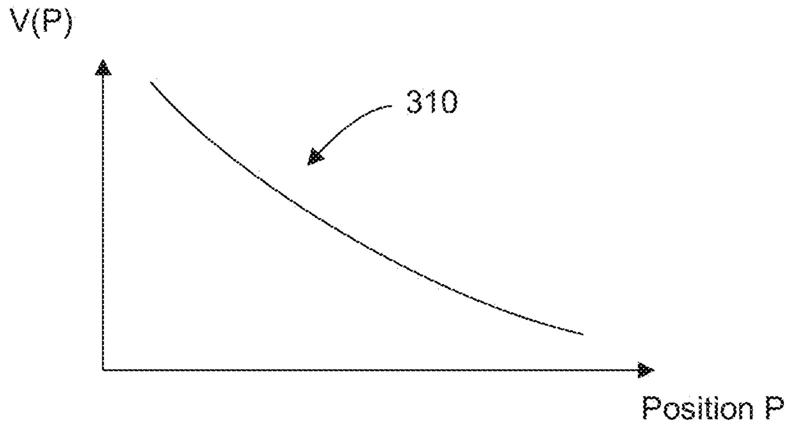
FIG. 3 shows an exemplary qualitative form for the positional visibility function in accordance with some embodiments.

FIG. 3 shows function 310 as an exemplary qualitative form for the positional visibility function in accordance with some embodiments. In function 310, the abscissa represents the value of the position P, and the ordinate represents the value of the positional visibility score V(P) for each position P. In the example of FIG. 3, positional visibility function 310 is a monotonically decreasing function of the position. In various embodiments, function 310 can be a linearly decreasing function, an exponentially decreasing function, or some other monotonically decreasing function. In some embodiments, while the positional visibility function generally decreases with the position, it is not a monotonic function. In some embodiments, the positional validity function acquires positive slopes for some values of the position and acquires negative slopes for some other values of the position. In particular, the local shape, for example, the slope and the curvature, of the positional visibility function may depend on the page number of the search page in which the position is located.

Function 310 is exemplary and is used to depict some qualitative characteristics of various positional visibility functions. The specific form of the positional visibility function depends on the implementation and can be a function that best matches empirical or theoretical relationships between visibility and position. The positional visibility function can be derived from empirical or theoretical relationships between the human attention and the location of an object on a page. Moreover, the quantitative values of the visibility score for each position, as well as the maximum and minimum values for the visibility score, can vary based on the implementation.

In some embodiments, the visibility score for a search result also depends on the popularity of the search engine that finds that search result. In some embodiments, visibility module 112 receives, along with each search result list, the name of the search engine that provides that search result list. A searcher may be more likely to use a more popular search engine, and thus a search result provided by that search engine is more visible to an average searcher. For example, a searcher looking for a name in a general context may be more likely to use Google™ search engine compared to other search engines. Thus, the visibility of a search result found by Google™ can be higher than the visibility of another search result that is found by another less popular search engine, even though the two search results may be positioned similarly in their respective search result lists, or even correspond to the same content. On the other hand, a searcher searching for a specialist in a specific field of technology may be more likely to use a specialized database or search engine, for example, Linkedin™ database. Thus, in some embodiments, the positional visibility function uses the popularity of the search engine as a factor for determining the visibility score of a search result.

In some embodiments, to calculate the visibility score for a search result, visibility module 112 accounts for the popularity of the search engine via a weight factor. For example, in one embodiment, a searcher may enter the same search term into three different search engines, for example, Google™, Yahoo!™, and Bing™ and the three searches may provide three different search results. The three search results may, however, include one or more common hits. A common hit may appear at similar or different positions of the search results lists provided by each of the three search engines, for example, at positions $P_G$, $P_Y$, and $P_B$, respectively. Therefore, by solely considering the positions of the hit in the search lists, visibility module 112 may assign visibility scores $V(P_G)$, $V(P_Y)$, and $V(P_B)$ to the three different appearances of the common hit, in which V( ) is the positional visibility function. In some embodiments, to find the total visibility of the common hit, visibility module 112 performs a weighted sum of the visibility scores corresponding to different search engines, wherein each weight corresponds to the relative popularity of the corresponding search engine. For example, assuming that Google™, Yahoo!™, and Bing™ are given respective exemplary popularity weights 40%, 30%, and 30%, the total visibility score for the common hit would be calculated from Equation (1):

$$V_{hit}=0.40\,V(P_G)+0.30\,V(P_Y)+0.30\,V(P_B) \quad (1)$$

More generally and in some embodiments, visibility module 112 calculates the visibility score for a hit found by one or more search engines using Equation (2):

$$V_h = \sum_i W_i V(P_i) \quad (2)$$

In Equation (2), $V_h$ is the visibility score for a specific hit, index i runs over various search engines, $W_i$ is the popularity weight of the i'th search engine, and $P_i$ is the position of the common hit as found by the i'th search engine. In some embodiments, the same information may be found more than once by the same search engine at different positions, and therefore the sum in Equation (2) will also run over various positions within the same search engine. In some embodiments, the value of the visibility score is normalized such that it is always between a predefined minimum and maximum, for example, 0 and 1. Further, in some embodiments, the sum is over search sources that include sources other than search engines, such as court or police databases, professional information databases, personal information databases, or publication databases, and $W_i$ is the popularity weight of the i'th source.

In some embodiments, visibility module 112 considers additional factors to calculate the visibility score for a hit. In some embodiments, for example, visibility module 112 considers the appearance of a hit in the list of search results. In some embodiments, when a searcher searches for a term, the search engine presents the search results in a list in which each hit is represented by a title of the hit, for instance, its URL, or by an excerpt of the hit including the search term, or by both. A hit may become more or less visible based on its representation in the list. Thus, visibility module 112 may also analyze that appearance and accordingly increase or decrease the visibility score of a hit. In some embodiments, visibility module 112 applies the strength of the representation as another weight factor in Equation (2). In some embodiment, this representation weight is a number between 0 and 1, where a stronger representation is given a larger weight. In some embodiments, the popularity weights of search engines, or the representation weights are discrete variables, which can take one of a finite number of values, e.g., 0, 0.5 and 1, or 0.5 and 1.

Figure 4:
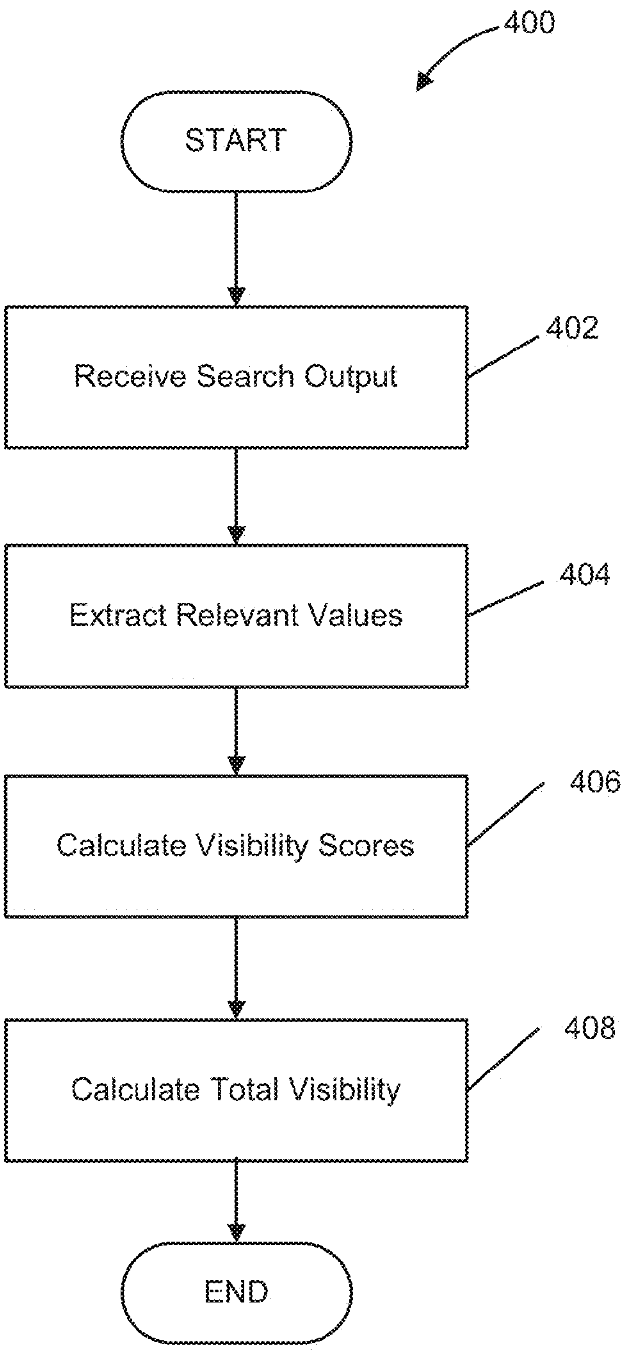
FIG. 4 shows a flowchart of a method for calculating the visibility score in accordance with some embodiments.

FIG. 4 shows a flowchart of a method 400 for calculating the visibility score in accordance with some embodiments. In some embodiments, method 400 is performed by visibility module 112. In block 402, search outputs are received. In some embodiments, search outputs include one or more search lists as provided by one or more search engines. In some embodiments, the provided search outputs only include true hits, and have already been purged from false hits. In some embodiments, search outputs also include positional information of each hit, information about the search engine, or the representation of each hit. In some embodiments, the received search output includes full search results for each search engine, as seen by a searcher, and also includes additional information which identify the location of the true hits in the full search results.

In block 404, relevant values are extracted from the received search output. For example, if the search output is received in the form of full search lists and the location of true hits, the extracted relevant values can include the positional information of each true hit, the search engine for each true hit, and the representation of each true hit.

In block 406, the visibility score for each hit is calculated. In some embodiments, the visibility score for each hit is calculated by using Equation (2) or the implementations thereof described above. In some other embodiments, the calculation also includes use representation weights or other factors which affect the visibility of each hit.

In some embodiments, in block 408, the total visibility score of a target is calculated. The total visibility score is measured via a weighted sum of visibility scores for all hits related to that target. For example, in some embodiments, the total visibility score for a target is calculated from Equation (3)

$$V_{total} = \sum_h W_h V_h \quad (3)$$

In Equation (3) $V_{total}$ is the total visibility score for a target, the sum is over all hits that are found for the target, and $V_h$ the visibility score for each hit. Moreover, $W_h$ is a weight factor given to each hit. In some embodiments, $W_h$ is one for all hits. Alternatively, in some embodiments, different hits are given different weights based on some characteristics of the hit. For example, in some embodiments, the format of a hit is used in deciding its weight. For example, in some embodiments, hits that are in the form of an image is given a higher weight than the hits that are in the form of a documents, because, in those embodiments, it is assumed that a searcher is more likely to actually open an image compared to a document.

While the visibility of the search results can determine the overall visibility of a target, whether that visibility is a positive or a negative visibility depends on the content of the search results. In some embodiments, UIP module 110 also includes sentiment module 114 (as shown in FIG. 2) for determining the sentiment of each of the search results. The sentiment of a search result indicates the effect of that search result on a searcher that reviews the content of the search result. When a searcher comes across a hit, the searcher may or may not further investigate the content of the hit by, for example, opening the URL. Whether the searcher notices a hit and investigates its content can depend on the visibility score of the hit. However, once the searcher investigates the content of a hit, the effect of the hit on the searcher depends on the specifics of the content. The content may cause the searcher to form a positive, a neutral, or a negative view of the target. The sentiment of a hit is a measure of this view of the target as conveyed by the content of a hit. In some embodiments, sentiment module 114 calculates a quantitative measure of the sentiment for each hit in the form of a sentiment score for the hit.

In some embodiments, sentiment module 114 calculates the sentiment score of a hit by reviewing the content of the hit. In some embodiments, sentiment module 114 calculates the sentiment score of a hit by reviewing negative or positive elements of the content of the hit in relation to the target. For example, if the hits are found by searching for the name of the target, sentiment module 114 may calculate the sentiment score of each hit by finding the proximity in the content between any positive or negative expressions and the name of the target. Positive expressions may include expressions of praise or expressions that carry a positive image of strength, intelligence, honesty, etc. Negative expressions, on the other hand, may include expression of disapproval or expressions that have negative connotations related to weakness, lack of intelligence, dishonesty, and so on. In some embodiments, if the content of the document is a text, sentiment module 114 can perform a linguistic analysis of the text to find whether the positive or negative expressions near the search term are related to the term. Such relationships can be found by finding, for example, associative pronouns or verbs. That is, for example, if the target name is Jane Doe, and the text of the hit includes the expression "Jane Doe is honest", sentiment module 114 determines that the positive word "honest" is associated with the target name "Jane Doe" via the verb "is". On the other hand, if the text includes "John Doe is dishonest, but not Jane Doe," sentiment module 114 determines that the negative word "dishonest", although appearing near the target name "Jane Doe", is not directly associated with the target name because they are separated by the expression ", but not". Similarly, sentiment module 114 may analyze a photo that is found in relation to a target to determine whether the photo includes dignifying or embarrassing elements, and whether those elements are related to the target. In some embodiments, some types or some parts of the contents may also be analyzed by a human analyzer. Upon analyzing the content of a hit, sentiment module 114 assigns a sentiment score to the hit.

Figure 5:
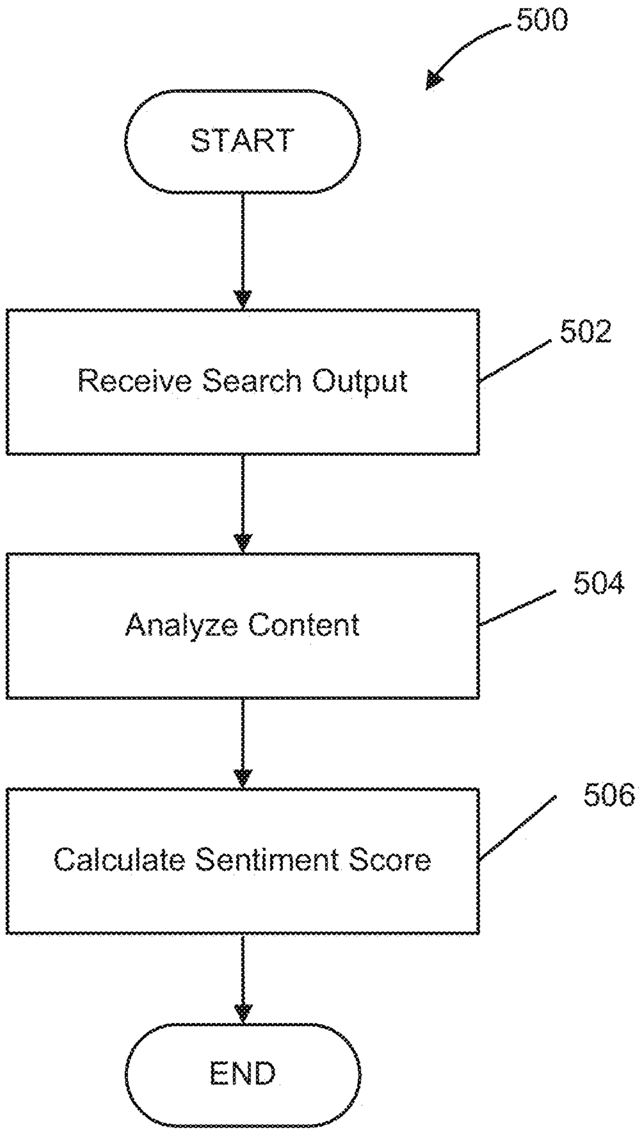
FIG. 5 shows a flowchart of a method for calculating the sentiment score in accordance with some embodiments.

FIG. 5 shows a flowchart of a method 500 for calculating the sentiment score in accordance with some embodiments. In some embodiments, method 500 is performed by sentiment module 114. In block 502, search outputs are received. In some embodiments, search outputs include a list of the real hits in a manner that the content of each hit can be further reviewed. In some embodiments, the search output is received in the form of a list of URLs or links to the content of each hit. Further, the received information also include the search terms that resulted in finding the hits. The contents of each hit and the search term are used to determine the sentiment of the content as related to the target.

In block 504, the content of each hit is analyzed to determined whether the content creates a positive or a negative view of the target. In some embodiments, the content of a hit is analyzed in the manner explained above, by searching for positive or negative elements included in the content and by determining the relation in the content between those elements and the search term.

In block 506, the sentiment score is calculated based on the results of the analysis. The analysis may provide zero, one, or more instances of positive or negative elements that have been connected to the target by the content. Further, the analysis may also provide the degree of the relationship between each element and the target by, for example, determining the distance between the target term and the found element. If, within the same content, more than one instances of positive or negative elements are found to be connected to the target, an overall sentiment score can be found by aggregating the effects of those instances. The aggregation may for example be performed by subtracting the total number of negative elements from the total number of positive elements. Alternatively, in some embodiments, each element can be given a positive or a negative value, based on their strength of their positive or negative effect. For example, some negative words may have a much stronger negative effect compared to other negative words, and are thus given a larger negative value. These values can then be added algebraically, to derive an overall positive or negative value for the total sentiment of the content. In some embodiments, the sum is a weighted sum, in which the weights are proportional to the proximity or linguistic connection of the element to the target. That is, an element that appears closer to the target or is linguistically directly related to the term, is weighted higher than farther or less related elements. In some embodiments, the sentiment score is normalized, such that the sentiment score is always between −1 and +1.

In some embodiments, the sentiment score of a hit is a binary variable that can take either of two values. That is, for example, a positive hit is given a sentiment score of +1 and a negative hit is given a sentiment score of −1. In some other embodiments, the sentiment score of a hit can take more than two values, and can even take a continuous range of values. For example, in some embodiments, the sentiment of a hit can take one of five values of "very good", "good", "neutral", "bad", and "very bad", respectively corresponding to five sentiment scores of +2, +1, 0, −1, and −2; or alternatively to five normalized sentiment scores of +1, +0.5, 0, −0.5, and −1. In some embodiments, a total sentiment score for a target is calculated by adding the sentiments scores of multiple hits for a target. In some embodiments, the sum is a weighted sum, in which the sentiment of each target is weighted by a weight that depends on one or more characteristics of the hit or the relevance of the hit to the target.

In various embodiments, reputation module 116 determines the reputation of the target based on the search results. In some embodiments, reputation module 116 receives, as input, the visibility score or the sentiment score of one or more of the search results, as determined by the visibility module 112 and sentiment module 114, respectively. Based on those inputs, reputation module 116 determines the reputation of the target. In some embodiments, reputation module 116 calculates a quantitative measure of the reputation of the target in the form of a reputation score or reputation vector for the target.

Figure 6:
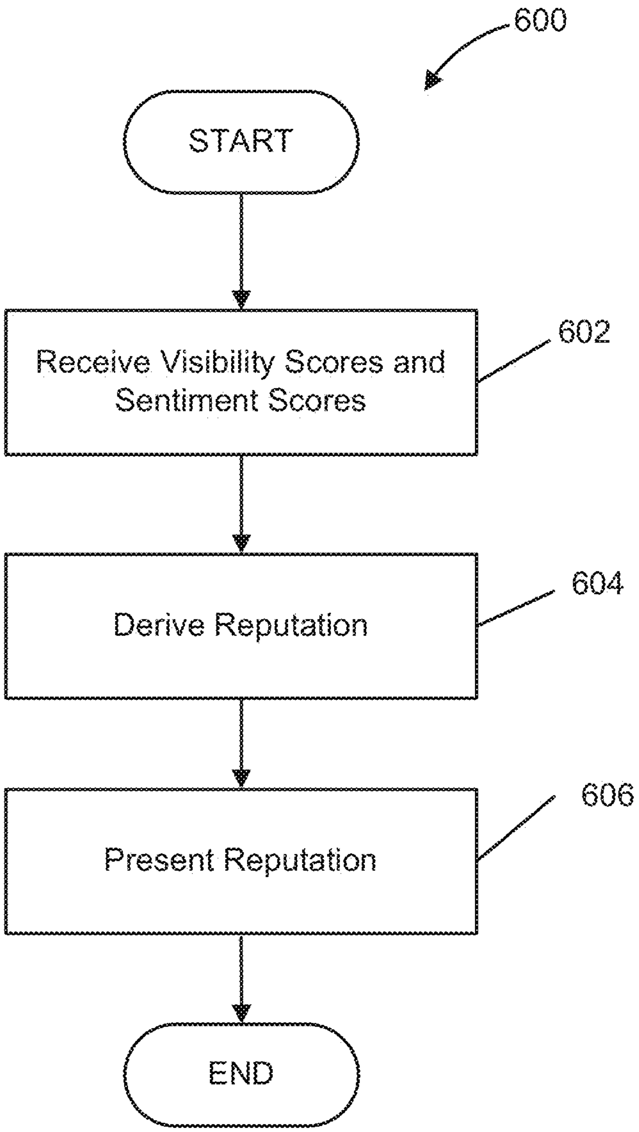
FIG. 6 shows a flowchart of a method for calculating the reputation score in accordance with some embodiments.

FIG. 6 shows a flowchart of a method 600 for calculating the reputation score in accordance with some embodiments. In some embodiments, method 600 is performed by reputation module 116. In block 602, visibility scores and sentiment scores are received. In some embodiments, visibility scores and sentiment scores are received for each hit that is found for the target. In some other embodiments, the total visibility score and the total sentiment score for a target are received.

In block 604, the reputation of the target is determined based on the inputs. In some embodiments, the reputation of a target is determined by calculating a reputation score. A reputation score is a number that represents the overall reputation of the target based on the hits. In some embodiments, the reputation score of a target is the product of the total visibility of the target and the total sentiment of the target.

Yet, in some other embodiments, the reputation score of a target is calculated as a total target reputation $R_{target}$. $R_{target}$ is calculated by performing an algebraic sum of the sentiments and the visibilities of various hits for the target. In some embodiments, $R_{target}$ is calculated as the weighted sum of the visibilities of each hit for the target, wherein each visibility is weighted with the sentiment of the hit. For example, in some embodiments, the reputation score of a target is calculated as the scalar reputation $R_{scalar}$ by using Equation (4)

$$R_{scalar} = \sum_h S_h V_h \tag{4}$$

In Equation (4), $R_{scalar}$ is the scalar reputation score of the target, $S_h$ is the sentiment of a hit, $V_h$ is the visibility of the hit, and the sum is over the hits for the target. In some embodiments each term on the right hand side, that is, the product of the sentiment and the visibility for each hit, is called the reputation score for that hit, and thus $R_{scalar}$ is called the total reputation score for the target, which is the algebraic sum of the reputation scores for the target's hits.

In some embodiments, also an absolute total visibility score is also calculated, which is the sum of the (positive) visibilities scores of all hits, irrespective of the sentiment of the hit, as shown in Equation (5):

$$V_{absolute} = \sum_h V_h \quad (5)$$

In Equation (5), $V_{absolute}$ stands for the absolute total visibility score, the sum is over the hits for the target, and $V_h$ is the visibility of the corresponding hit.

In some embodiments, the combination of the visibility and sentiment for each hit is considered as representing a reputation vector for the hit, and the total reputation of the target is the sum of the reputation vectors for each hit.

In some embodiments, for each hit, the visibility of the hit determines the length of its reputation vector, and the sentiment of the hit determines the phase (angle) of the reputation vector. In particular, in some embodiments, the length of the reputation vector is calculated as a visibility length, which is proportional to the visibility of the hit. For example, in some embodiments, the visibility length for a hit is the normalized value of the visibility for the hit. In some embodiments, the visibility length is calculated by normalizing the visibility of the hit via Equation (6) below:

$$L(V) = \frac{V}{V_{max}} \quad (6)$$

In Equation (6), L(V) is the visibility length as a function of the visibility V, and $V_{max}$ is the maximum possible value of the visibility.

Similarly, in some embodiments, the phase of the reputation vector is represented by a sentiment angle θ(S), which is a monotonic function of the sentiment (S) for each hit. For example, in some embodiments, θ(S) is 0 degrees for the maximum (most positive) sentiment, and 180 degrees for the minimum (most negative) sentiment, and is between 0 and 180 degrees for a sentiment between the maximum and the minimum sentiment. In some other embodiments, θ(S) is 90 degrees for the maximum (most positive) sentiment, and −90 degrees for the minimum (most negative) sentiment, and is between 90 and −90 degrees for a sentiment between the maximum and the minimum sentiment. For example, in some embodiments, θ(S) is calculated by via Equation (7):

$$\theta(S) = \frac{S_{max} - S}{S_{max} - S_{min}} \times 180^\circ \quad (7)$$

In Equation (7), $S_{max}$ and $S_{min}$ are respectively maximum and minimum possible sentiments, and θ(S) is the sentiment angle.

Figure 7:
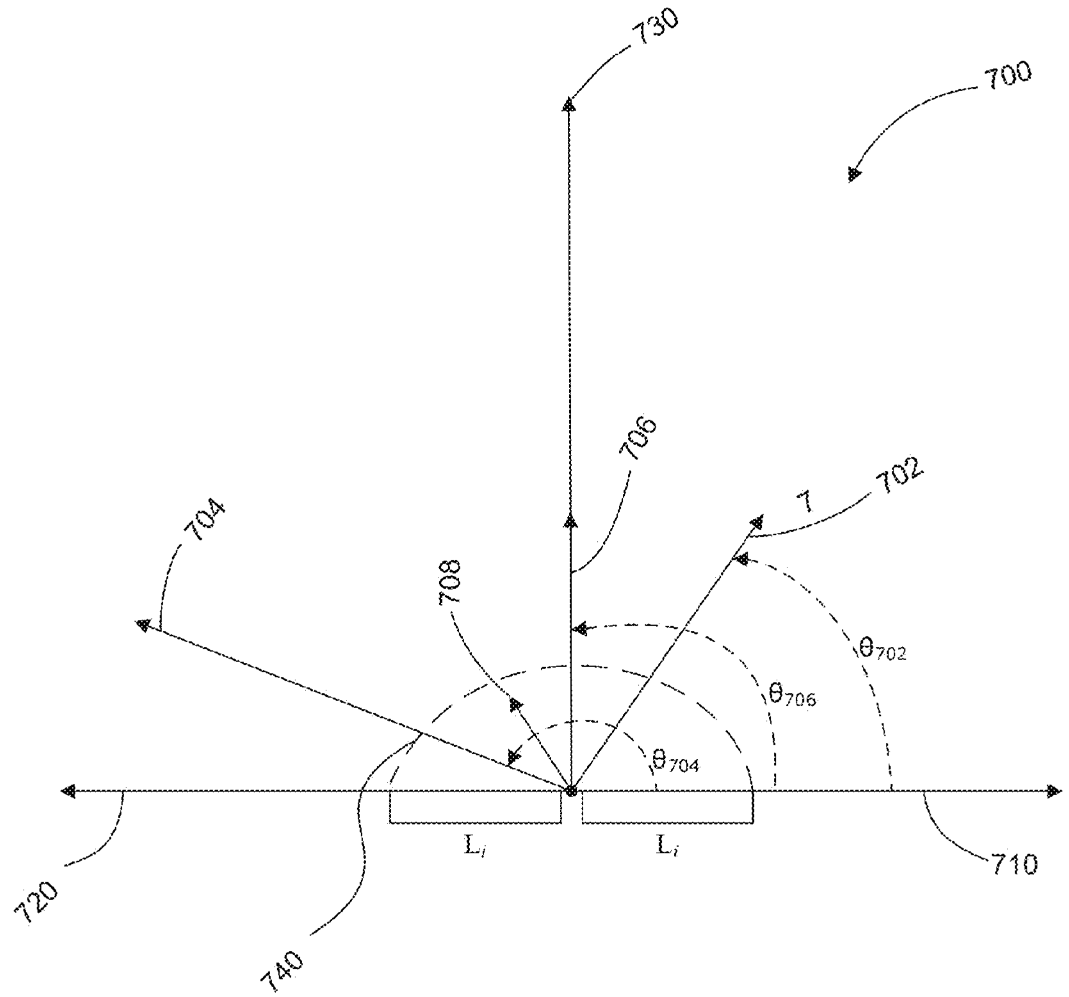
FIG. 7 is a schematic of vector view including vector representations in accordance with some embodiments.

In some embodiments, each hit is associated with a reputation vector $R_h$ for which the length is the visibility length for the hit ($L(V_h)$) and the angle is the sentiment angle for the hit ($\theta(S_h)$). FIG. 7 is a schematic of vector view 700 including vector representations for three reputation vectors, in accordance with some embodiments. Vector view 700 includes a positive reputation axis 710, a negative reputation axis 720, a neutral reputation axis 730, and an invisibility zone 740. Positive reputation axis 710 points to the right (that is, to 0 degrees trigonometric angle), negative reputation axis 720 overlaps positive reputation axis 710 but points to the left (that is, to 180 degrees trigonometric angle), and neutral reputation axis 730, also called neutrality axis, is perpendicular to positive and negative reputation axes 710 and 720 and points upward (that is, to 90 degrees trigonometric angle). Invisibility zone 740 is a semicircular area above the 710 and 720 axes, centered at the origin with a radius of $L_i$, wherein $L_i$ is called the invisibility limit.

Vector view 700 also depicts four exemplary reputation vectors 702, 704, 706, and 708 corresponding to four hypothetical hits (here called first, second, third, an fourth hits). Reputation vector 702 is shorter than reputation vector 704 and longer than reputation vector 706, indicating that the first hit corresponding to vector 702 is less visible than the second hit corresponding to vector 704 and more visible than the third hit corresponding to vector 706. Reputation vector 702 is in the first quadrant, that is, the angle of reputation vector 702, labeled $\theta_{702}$, is between 0 and 90 degrees, 0 degrees included. According to this embodiment, the first quadrant is the positive reputation zone meaning that reputation vectors located in the first quadrant indicate a positive sentimental score, that is, a sentimental score greater than zero. Thus, reputation vector 702 indicates that for the first hit the sentimental score is positive.

Reputation vector 704, on the other hand, is in the second quadrant, that is, its angle, labeled $\theta_{704}$, is between 90 and 180 degrees, 180 degrees included. According to this embodiment, the second quadrant is the negative reputation zone, meaning that reputation vectors located in the second quadrant indicate a negative sentimental score, that is, a sentimental score less than zero. Thus, reputation vector 704 indicates that for the second hit the sentimental score is negative.

Reputation vector 706 overlaps neutrality axis 730, that is, its angle is exactly 90 degrees. Such a reputation vector indicates a neutral, i.e., a zero, sentimental score, for the third hit.

Reputation vector 708 is in the second quadrant and falls inside invisibility zone 740, that is, its length is less than invisibility limit $L_i$. In this embodiment, hits for which the visibility is less than $L_i$ is considered invisible. An invisible hit, or an invisible reputation, is a reputation for which the visibility is so low that for all practical purposes it is assumed that a searcher will not notice it, or will ignore it. The value of invisibility limit $L_i$ can be determined, based on theories or experiments, and can be application specific. When a reputation vector, such as reputation vector 708, falls inside invisibility zone 740, for all practical purposes the effect of that reputation vector can be ignored, regardless of its sentiment, that is, no matter in which quadrant it falls.

In some embodiments, the overall reputation vector for a target is derived by a vector sum method, as the vector sum of the reputation vectors for various hits for the target. As each vector can be represented by a complex number $L \times e^{i\theta}$ in which L and θ are respectively the length and phase of the vector, the vector sum of all reputations vectors can be calculated by Equation (8):

$$\vec{R}_{target} = \sum_h L(V_h) e^{i\theta(S_h)} \quad (8)$$

In Equation (8) $\vec{R}_{target}$ is the overall reputation vector for the target derived via the vector sum method, the sum is over all the hits for the target, and $L(v_h)$ and $\theta(S_h)$ are respectively the visibility length and the sentiment angle attributed to the reputation vector for each hit.

In some other embodiments, the total reputation vector is derived via scalar projection method. In the scalar projection method, the total reputation vector is derived as a unique vector, called $\vec{R}_{sp}$, such that the length of $\vec{R}_{sp}$ is the absolute total visibility score $V_{absolute}$ for the target, as derived from Equation (5), and the projection of $\vec{R}_{sp}$ along the reputation axes is the scalar reputation score $R_{scalar}$ for the target, as calculated from Equation (4).

Returning to FIG. 6, in block 606 the overall reputation of the target is represented to the user. In some embodiments, the overall reputation is a reputation score, represented to the user as a number. A positive reputation score indicates an overall positive image for the target and a negative reputation score indicates an overall negative image for the target. Further, the absolute value of the reputation score indicates the level of visibility for the target; a larger absolute value indicating a more visible target.

Figure 8:
FIG. 8 shows an exemplary panel view in accordance with some embodiments.

In some embodiments, the overall reputation is presented as an overall reputation vector for the target. FIG. 8 shows an exemplary reputation panel view 800 in accordance with some embodiments. Panel view 800 includes a reputation dashboard 810, personal data section 820, and public image section 830.

Dashboard 810 includes a vector view 802 which shows a reputation vector 804 for a user. In particular, vector view 802 includes an invisibility zone 806. Vector view 802 also includes a high visibility zone 808, which is the zone in which the visibility length is larger than a high visibility threshold. The area between the invisibility zone and the high visibility zone is called moderate visibility zone, and corresponds to reputation vectors for which the visibility length is between the invisibility limit and the high visibility threshold. Vector view 802 also includes a negative reputation zone and a positive reputation zone. Negative and positive reputations zones can be distinguished by different colors (e.g., red for negative and green for positive reputation zones), different shades of a color (for example, a stronger shade of red indicating a more negative reputation, and a stronger shade of green indicating a more positive reputation) or different shades of black (e.g., a dark shade for the negative and a lighter shade or no shade for the positive reputation zones).

Vector view 802 also shows a reputation vector 804 by its end point, shown as an icon of a person. In various embodiments, reputation vector 804 is derived using a method appropriate for the embodiment, such as the vector sum method or the scalar projection method.

Reputation vector 804 is in the negative reputation zone, that is, the second quadrant. Moreover, reputation vector 804 is in the moderate visibility zone, that is, between the invisibility zone and high visibility zone. Thus, the reputation of the target corresponding to reputation vector 804 is negative and moderate, as the panel view 800 indicates to the viewer.

In the embodiment shown in FIG. 8, personal data section 820 displays some information about the target, such as the target's name phone number, birthday, and address. Further, in FIG. 8, and public image section 830 presents the number of searches made for the target in a period of time, such as a previous month, the number of top twenty search results which were in fact related to the target (e.g., were hits), and the possibility that the target would be found from search. Moreover, public image section 830 presents to the user the number of the hits that were either positive, negative, or neutral.

Each of the modules described above may comprise multiple modules. The modules may be implemented individually or their functions may be combined with the functions of other modules. Further, each of the modules may be implemented on individual components, or the modules may be implemented as a combination of components. For example, each of the modules may be implemented by a field-programmable gate array (FPGA), an application-specific integrated circuit (ASIC), a complex programmable logic device (CPLD), a printed circuit board (PCB), a combination of programmable logic components and programmable interconnects, single CPU chip, a CPU chip combined on a motherboard, a general purpose computer, or any other combination of devices or modules capable of performing the tasks of the corresponding module. In some embodiments, one or more of the disclosed methods are stored in the form of programs on one or more non-transitory computer readable mediums. A computer readable medium can be a data storage medium. A data storage module may comprise a random access memory (RAM), a read only memory (ROM), a programmable read-only memory (PROM), a field programmable read-only memory (FPROM), or other dynamic storage device for storing information and instructions to be used by another module, such as a data processing module or a search module. A data storage module may also include a database, one or more computer files in a directory structure, or any other appropriate data storage mechanism such as a memory.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

The invention claimed is:

1. An apparatus comprising:

one or more computer processing units configured to execute instructions associated with a plurality of modules, the modules comprising:

a visibility module configured to derive a hit visibility score for one or more hits from an information source, wherein the one or more hits result from one or more searches directed to a target entity and include information about the target entity, and wherein the hit visibility score indicates a likelihood that a corresponding hit is found by a searcher after the searcher searches for the target entity in the information source;

a sentiment module configured to derive a hit sentiment score for at least one of the one or more hits, wherein the hit sentiment score indicates a sentiment about the target entity conveyed by the at least one of the one or more hits; and a reputation module configured to derive a reputation for the target entity based on the hit visibility score and the hit sentiment score; and a data storage configured to store the one or more hits.

2. The apparatus of claim 1, wherein the one or more hits are received in a search result list, and wherein the visibility module derives the hit visibility score based on a position of the one or more hits in the search result list.

3. The apparatus of claim 2, wherein the search result list includes one or more search results pages and wherein the position of the corresponding hit includes information about a page number of a page on which the corresponding hit is located and a location of the corresponding hit on the page.

4. The apparatus of claim 1, wherein the one or more hits are a plurality of hits from a plurality of information sources, and wherein the reputation module performs a weighted sum over the plurality of hits, in which each hit visibility score is weighted by a source weight factor for the corresponding information source, and wherein each source weight factor is a measure of a relative popularity of the corresponding source.

5. The apparatus of claim 1, wherein the sentiment module derives the hit sentiment score by analyzing content of the at least one hit.

6. The apparatus of claim 5, wherein the sentiment module derives the hit sentiment score by determining one or more elements in the content that convey the positive or the negative image about the target entity.

7. The apparatus of claim 6, wherein the sentiment module derives the hit sentiment score by determining a correlation in the content between each of the one or more elements in the content with the target entity.

8. The apparatus of claim 1, wherein the reputation module derives the reputation for the target entity by calculating a reputation score, wherein the reputation score is a sum of the hit visibility scores each weighted by the hit sentiment score for the corresponding hit.

9. The apparatus of claim 8, wherein the hit sentiment score for one hit of the one or more hits is a positive number or a negative number if the one hit respectively conveys a positive or a negative image of the target entity.

10. The apparatus of claim 1, wherein the reputation module derives the reputation for the target entity by calculating a reputation vector, wherein a length of the reputation vector is derived from the hit visibility scores for the one or more hits, and an angle of the reputation vector is derived from the hit sentiment scores for the one or more hits.

11. A computer-implemented performed by one or more computer processing units, method comprising:

deriving a hit visibility score for one or more hits from an information source, wherein the one or more hits result from one or more searches directed to a target entity and include information about the target entity, and wherein the hit visibility score indicates a likelihood that a corresponding hit is found by a searcher after the searcher searches for the target entity in the information source;

deriving a hit sentiment score for at least one of the one or more hits, wherein the hit sentiment score indicates a sentiment about the target entity conveyed by the at least one of the one or more hits; and deriving, at the one or more computer processing units, a reputation for the target entity based on the hit visibility score and the hit sentiment score.

12. The method of claim 11, wherein the one or more hits are received in a search result list, and wherein the hit visibility score is derived based on a position of the one or more hits in the search result list.

13. The method of claim 12, wherein the search result list includes one or more search results pages and wherein the position of the corresponding hit includes information about a page number of a page on which the corresponding hit is located and a location of the corresponding hit on the page.

14. The method of claim 12, wherein the hit visibility score is derived by inserting the position of the corresponding hit in a positional visibility function.

15. The method of claim 11, wherein the one or more hits are a plurality of hits from a plurality of information sources, and wherein deriving a reputation for the target entity includes performing a weighted sum over the plurality of hits, in which each hit visibility score is weighted by a source weight factor for the corresponding information source, and wherein each source weight factor is a measure of a relative popularity of the corresponding source.

16. The method of claim 11, wherein the hit sentiment score is derived by analyzing the content of the at least one hit.

17. The method of claim 16, wherein the hit sentiment score is derived by determining one or more elements in the content that convey the positive or the negative image about the target entity.

18. The method of claim 17, wherein the hit sentiment score is derived by determining a correlation in the content between each of the one or more elements in the content with the target entity.

19. The method of claim 11, wherein the reputation is derived for the target entity by calculating a reputation score, wherein the reputation score is a sum of the hit visibility scores weighted by the hit sentiment score for the corresponding hit.

20. The method of claim 19, wherein the hit sentiment score for the at least one hit is a positive number or a negative number if the corresponding hit respectively conveys a positive or a negative image of the target entity.

21. A non-transitory computer readable medium encoded with a program that, when read by a computer, causes the computer to perform the method of claim 11.

* * * * *